Dec. 27, 1949     G. B. BARTON     2,492,257
WEIGHING SCALE FOR THE BLIND
Filed June 29, 1946
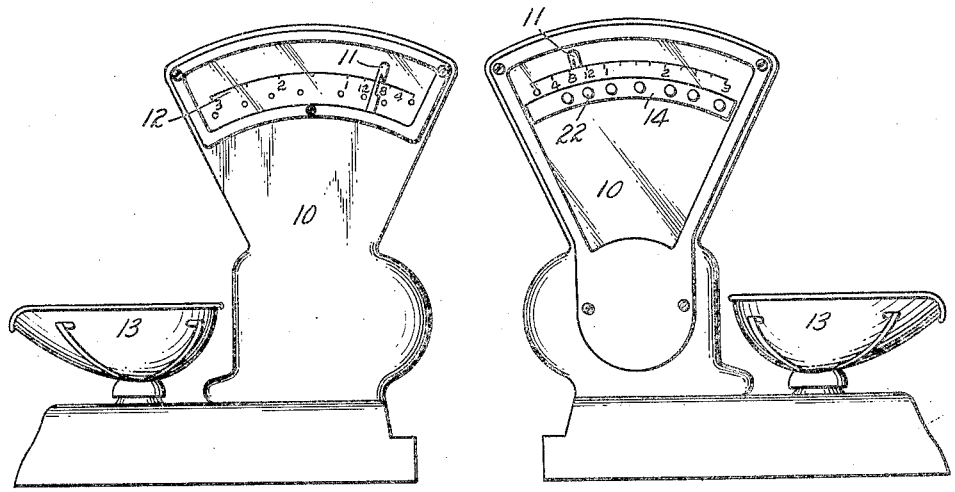
Fig. 1     Fig. 2
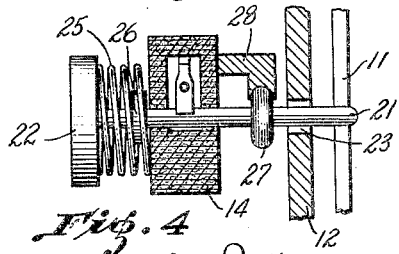     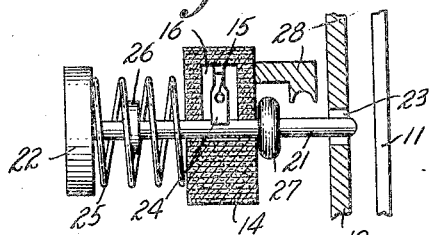
Fig. 4     Fig. 3
Inventor:
GEORGE B. BARTON
By P. J. Elliott
Attorney Patented Dec. 27, 1949

2,492,257

UNITED STATES PATENT OFFICE 2,492,257

WEIGHING SCALE FOR THE BLIND

George B. Barton, Tacoma, Wash.

Application June 29, 1946, Serial No. 680,338

1 Claim. (Cl. 177—311)

This invention relates to devices whereby a blind person may weigh out a desired quantity of merchandise with certainty and accuracy and has for its objects to provide a means, operated by the blind man, which will form a stop for the weight indicating arm, or other movable part, and which will automatically sound an alarm, notifying the blind man when the goods weighed equal the quantity ordered; which will cease ringing the alarm upon the removal from the scale of sufficient goods to bring the weight down below the required amount, and thus permit the operator to sell the exact amount of goods desired. A further object is to provide an apparatus which may readily be applied to weighing scales of any standard or special design, and which will not interfere with the ability of the customer to check the reading on the scale, and which is cheap to make and easy and accurate to operate.

I attain these and other objects which will be readily apparent to those skilled in the art, by the devices, mechanisms and arrangements illustrated in the accompanying drawings, in which—

Fig. 1 is a general front elevation of a scale equipped with my invention; Fig. 2 is a rear elevation thereof; Figs. 3 and 4 are diagrammatic sections showing, respectively, one of the push rods before and after it has been operated; Figs. 5 and 6 are diagrammatic cross-section and longitudinal section showing the contact brush; Fig. 7 is a diagrammatic sectional view showing some push rods and their operation; and Fig. 8 is a diagrammatic view of the electric circuit.

Similar numerals of reference refer to similar parts throughout the several views.

The blind who attempt to conduct commercial establishments are handicapped in that they have to confine their sales to packaged goods, or to single articles, and cannot deal readily in goods sold by weight, such as candy, nuts and other bulk goods, because there is no known way to indicate to the salesman when he has weighed out the desired quantity of goods correctly. It is for this reason that I have invented the following described means of assuring the salesman that the correct weight of goods is being sold.

Referring to the drawings, it will be seen that the front of the scales 10 is substantially unchanged in appearance from any similar scale (Fig. 1) and that the customer may see by the position of the movable pointer or contactor 11 on the pointer scale sheet 12, the exact weight of goods in the scoop 13.

As seen in Fig. 2, the rear side of the scales is provided with a curved bar 14, of insulating material, located near the rear side of said scale sheet 12. An electrified conductor 15 is mounted in a cavity 16, running from end to end of said bar 14. This conductor 15 is electrically connected by the wire 17 with the bell 18 and one side of the battery 19, while the other side of the battery 19 is connected by the wire 20 to the pointer 11 of the scale.

A series of push rods 21, each having a suitable push button 22, pass through the bar 14 and through openings 23 in the scale sheet 12, and normally do not extend into the path of the pointer 11 but, when operated by the salesman, extend into the path of the pointer 11 and contact therewith when the pointer 11 has reached the place which the particular push rod 21 represents. These rods 21 are electrified by small contacts or brushes 24, secured on the conductor 15 and engaging the said rods 21, so that as soon as contact is made between the rod 21 and the pointer 11 an electrical impulse rings the bell 18, thus warning the salesman that the required amount of goods has been placed in the scoop 13. If the salesman thinks he has allowed too much goods to fall into the scoop 13 he may remove some until the bell ceases to ring. It is, of course, understood that the push rods 21 are positioned to make contact with the pointer 11 at certain definite weights, and that the blind man will quickly learn the location of the particular button 22 representing each unit of weight.

Light springs 25 may be wound around the rods 21 to hold them from being accidentally pushed into contacting position. Stops 26 and 27 may be secured to the rods 21 to limit their motion; and spring clips 28 may be engaged by said stops 27, when the rod to which it is attached is in contacting position, to hold said rod 21 out until released by a touch from the hand of the operator.

Thus it will be seen that my improved weighing scales for the blind will promptly notify the operator as soon as he has placed the required weight of goods in the scoop and that this apparatus is entirely dependable both by the customer and by the salesman.

Though I have illustrated this invention as above described, it is evident that the contact between the pointer and the push rod may be modified so that the action is entirely invisible in the framework of the scale, so long as one part depends for its position on the weight of goods in the scoop and so long as the manually operated push rod is adapted to make contact therewith when the weight in the scoop equals the selected weight represented by that particular push rod. It is also evident that the form of the push rods may be radically changed, for instance, they may resemble the well known keys of a typewriter, all that is necessary is that each key is adapted to bring contact between the weighing mechanism (represented by the pointer) and the selected key when the proper weight is in the scoop. It is also evident that the electric bell may be substituted by a gong, a sounder, buzzer, or other device. Many other changes in the details of construction may be made, and the mechanism may be adapted to any form of weighing scales, without departing from the spirit of my invention as outlined in the appended claim.

Having described my invention, what I claim and desire to secure by Letters Patent is:

In a weighing scale for the blind, the combination with a commercial scale having a movable contactor whose position is controled by the weight of the material being weighed; of an elongated bar of insulating material having a longitudinal cavity therein; an electrical conductor mounted in said cavity; a plurality of push rods mounted in and extending across said bar and through said cavity; each said push rod extending adjacent to the path of said contactor and respectively positioned, when in active position, to contact said contactor when the weight on the scale is a predetermined amount; brushes on said conductor and engaging each said push rod; stops on each said push rod on each side of said bar to limit the motion of said push rod by engagement with said bar; push buttons on said push rods; spring clips engaging said stops and adapted to retain each said push rod in extended position; springs engaging said buttons to retract said push rod from extended position when said spring clip is manually released; and an electric circuit including a sounder, connected to said contactor and to said electric conductor, whereby when said contactor engages the extended push rod said sounder is energized.

GEORGE B. BARTON.

REFERENCES CITED

The following references are of record in the file of this patent:

UNITED STATES PATENTS

| Number | Name | Date |
|---|---|---|
| 513,829 | Schureman | Jan. 30, 1894 |
| 1,742,229 | Wood | Jan. 7, 1930 |
| 1,933,088 | Battegay | Oct. 31, 1933 |
| 2,383,321 | Kleber | Aug. 21, 1945 |

FOREIGN PATENTS

| Number | Country | Date |
|---|---|---|
| 214,061 | Germany | Aug. 21, 1945 |